(12) United States Patent
Maeda et al.

(10) Patent No.: US 6,634,235 B2
(45) Date of Patent: Oct. 21, 2003

(54) LOAD SENSOR WITH STRAIN-SENSING ELEMENTS

(75) Inventors: Ryoichi Maeda, Miyagi-ken (JP); Akito Miura, Miyagi-ken (JP); Koichi Takahashi, Miyagi-ken (JP); Osamu Tanabe, Miyagi-ken (JP); Kiyoshi Suzuki, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/004,902

(22) Filed: Nov. 7, 2001

(65) Prior Publication Data

US 2002/0062700 A1 May 30, 2002

(30) Foreign Application Priority Data

Nov. 30, 2000 (JP) ........................ 2000-365391
Jan. 9, 2001 (JP) ........................ 2001-001676

(51) Int. Cl.⁷ .............. G01L 1/22; G01L 1/04; G01G 1/38
(52) U.S. Cl. .............. 73/781; 73/862.045; 73/862.634; 177/211
(58) Field of Search .............. 73/781, 862.045, 73/862.633, 862.634; 177/211

(56) References Cited

U.S. PATENT DOCUMENTS 4,423,640 A * 1/1984 Jetter ........................ 338/5
4,542,800 A * 9/1985 Knothe et al. .............. 177/211
5,142,915 A * 9/1992 Bergstrom ................... 73/727
5,510,581 A * 4/1996 Angel ....................... 177/211

FOREIGN PATENT DOCUMENTS

| JP | 354107372 A | * | 8/1979 |
| JP | 354107373 A | * | 8/1979 |
| JP | 354124769 A | * | 9/1979 |
| JP | 354124770 A | * | 9/1979 |
| JP | 58-56423 | | 12/1983 |

* cited by examiner

*Primary Examiner*—Edward Lefkowitz
*Assistant Examiner*—Lilybett Martir
(74) *Attorney, Agent, or Firm*—Beyer, Weaver & Thomas, LLP.

(57) ABSTRACT

A load sensor is provided, which prevents defective printing of strain-sensing elements caused by the deflection of a pressure-receiving portion and provides stabilized quality and fabrication yields. The load sensor is provided with the strain-sensing elements printed on the pressure-receiving portion. The tip portion of the strain generating portions having a loading point is allowed to stay in advance below the plane containing the print surface of the strain generating portions in the direction of thickness. The tip portion of the pressure-receiving portion will never stay above the print surface of the strain generating portions even when the pressure-receiving portion is deflected in the heating process during fabrication. Therefore, this makes it possible to avoid defective printing of the strain-sensing elements caused by the deflection of the pressure-receiving portion.

1 Claim, 9 Drawing Sheets

LOAD SENSOR WITH STRAIN-SENSING ELEMENTS

BACKGROUND OF THE INVENTION

1. Field of the Invention

The present invention relates to a load sensor for sensing a load, applied to a loading point of the pressure-receiving portion, by the deflection of a strain-generating portion which is provided with a strain-sensing element or in which the strain-sensing element is formed by printing.

2. Description of the Related Art

FIG. 17 is a plan view illustrating a prior-art load sensor of this type. FIG. 18 is a cross-sectional view taken along line 18—18 of FIG. 17. Referring to these figures, a base body of the load sensor is generally designated by reference numeral 1. The base body 1 is formed of a sheet of metal, and comprises a mount portion 2 on the side of a securing end and a pair of strain generating portions 4 that extend from the mount portion 2 along the rims on both sides of an opening 3 adjacent thereto. The base body 1 further comprises a link portion 5 for linking the free ends of the strain generating portions 4 together and a pressure-receiving portion 6 that projects in the shape of the tongue from the link portion 5 into the opening 3.

The base body 1 has a flat print surface on which an insulative-coated layer and a trace pattern (not shown in any figures) are formed by printing. Each of the strain generating portions 4 is reduced in thickness at a portion 4a near the mount portion 2 and at a portion 4b near the link portion 5. On the insulative-coated layer overlying the thin portions 4a, 4b, strain-sensing elements 7, 8 of a thick-film resistive material are formed by printing, respectively. Incidentally, the strain-sensing elements 7, 8, arranged at four points in total, are interconnected with the aforementioned trace pattern to constitute a Wheatstone bridge circuit. There are provided a pair of screw holes 2a bored in the mount portion 2, in each of which a bolt 9 is inserted. The head of the bolt 9 exerts a pressure on the circumferential portion of the screw hole 2a, thereby securing the mount portion 2 to an external support member 10. There is provided a loading point 6a on the tip portion of the tongue-shaped pressure-receiving portion 6. External application of a load to the loading point 6a will produce bending moments, opposite in direction to each other, on the thin portions 4a, 4b of each of the strain generating portions 4. This causes each of the strain generating portions 4 to be deformed slightly in the shape of a letter "S". In other words, the application of a load to the loading point 6a from above will cause the thin portion 4a, the closer of the thin portions 4a, 4b in each of the strain generating portions 4 to the mount portion 2, to be deformed in an upward convex shape. In contrast, the thin portion 4b, the closer to the link portion 5, will be deformed in a downward convex shape. Accordingly, the strain-sensing element 7 on the portion 4a senses a tensile stress, whereas the strain-sensing element 8 on the portion 4b senses a compressive stress. The level of the strain, which is produced in the strain generating portions 4 and sensed with the strain-sensing elements 7, 8, makes it possible to determine the load acted upon the loading point 6a.

Incidentally, also known is a load sensor, comprising a cantilever-shaped plate member with a strain-sensing element, in which a load is applied to the tip portion of the member. This load sensor is not capable of sensing stress at a plurality of points where bending moments opposite in direction to each other are produced, being therefore subject to a problem of providing an insufficient accuracy in comparison with the aforementioned load sensor.

The prior-art load sensor shown in FIG. 17 is subject to variations in performance since no consideration is given to the effects exerted by the fastening force applied to secure the mount portion 2. That is, the base body 1 is attached to the support member 10 using securing screw means such as the bolt 9, thereby causing the circumferential portion of the screw holes 2a of the mount portion 2 or the securing end portion of the base body 1, to be strongly pressurized onto the support member 10. The strong pressurization of the base body 1 formed of a sheet of metal will cause a radial stress to act also upon and thereby produce a deformation in a portion outside the directly pressurized portion. This deformation is apt to have an adverse effect on the characteristic of the neighboring strain-sensing element 7. In addition, since the deformation caused by the fastening force is slightly different from product to product, the strain-sensing element 7 delivers different outputs, varying from product to product, even under the same load applied to the loading point 6a. This makes it difficult to provide the desired reliability.

The prior-art load sensor shown in FIGS. 17 and 18 is fabricated through the process in which a trace pattern, the strain-sensing elements 7, 8 or the like are formed by printing on a flat print surface of the base body 1. Therefore, this makes the load sensor suitable for mass production at low costs. However, the print surface of the base body 1 is designed to accommodate all the components in the same plane including the pressure-receiving portion 6. This would cause the tongue-shaped pressure-receiving portion 6 to be subjected to deflections in the heating process for forming the trace pattern or the like by printing, thereby causing the tip portion of the pressure-receiving portion 6 having the loading point 6a to sit above the print surface in some cases. In those cases, being interfered with the tip portion of the pressure-receiving portion 6, the strain-sensing elements 7, 8 would not be printed smoothly, thereby raising the possibilities of impairing the sensing accuracy and reducing fabrication yields.

SUMMARY OF THE INVENTION

The present invention has been developed in view of the aforementioned circumstances of the prior art. It is therefore an object of the present invention to provide a highly reliable load sensor which does not allow the fastening force for attaching the securing end portion to have an adverse effect on the characteristic of the strain-sensing element and provides reduced variations in performance from product to product. It is another object of the present invention to provide a load sensor in which defective printing of strain-sensing elements caused by deflection of the pressure-receiving portion can be avoided and which is suitable for providing stabilized quality and improved fabrication yields.

To achieve the aforementioned objects, the present invention provides a load sensor comprising: a mount portion on one end of the load sensor, the mount portion having a screw hole for allowing securing screw means to be inserted therein, the securing screw means applying a pressure to a circumferential portion of the screw hole to thereby secure the mount portion to the securing screw means; strain-generating portions extending from the mount portion to the other end of the load sensor along side rims of an opening; a pressure-receiving portion, linked to the strain-generating portions at the other end, projecting in the shape of the tongue into the opening, having a loading point at an end point; strain-sensing elements, formed in the strain-generating portions, for sensing strain of the strain generating portions, the strain caused by a load applied to the loading point. The load sensor is adapted that at least part of the opening is interposed between the center of the screw hole and the strain-sensing elements.

This allows the deformation caused by a strong fastening force for pressurizing the circumferential portion of the screw hole to be blocked by the opening and thereby not to have a direct effect on the strain-sensing elements. The characteristic of the strain-sensing elements is therefore prevented from varying from product to product. The load sensor may comprises, as the strain-sensing elements, a first strain-sensing element formed at an area of the strain-generating portions near the mount portion and a second strain-sensing element formed at an area of the strain-generating portions near a link portion with the pressure-receiving portion. In this configuration, the load sensor may be adapted to sense the tensile stress and the compressive stress of the strain-generating portion which is deflected slightly in the shape of a letter "s" when a load is acted upon the loading point of the pressure-receiving portion. This makes it possible to provide a highly reliable load sensor which has a good sensing accuracy and reduced variations in performance from product to product. The load sensor may be adapted that the distance between the loading point and the first strain-sensing element is generally equal to the distance between the loading point and the second strain-sensing element. This allows the tensile stress sensed by the first strain-sensing element to be generally equal in magnitude to the compressive stress sensed by the second strain-sensing element. This preferably simplifies the configuration of the bridge circuit containing the strain-sensing elements.

In the aforementioned configuration, the mount portion, the strain-generating portion, and the pressure-receiving portion may be provided on one piece of plate-shaped member. This allows the base body of the load sensor to be easily machined and a bridge circuit containing the strain-sensing elements to be easily formed on the base body by a method such as printing, thereby making it possible to fabricate the load sensor at low costs. The strain-generating portion may be made thinner than the mount portion and the pressure-receiving portion in thickness, thereby allowing the strain-generating portion to deflect easily and thus provide improved accuracy readily.

In the aforementioned configuration, the load sensor may be provided with a projection, projecting in the direction of thickness of the pressure-receiving portion, on the tip portion of the pressure-receiving portion, and the top portion of the projection acting as the loading point. This ensures that the load of a measurement object can be applied to the loading point even when the measurement object is more or less misaligned with the load sensor in the direction of the surface of the load sensor. Therefore, this makes it possible for the load sensor to avoid malfunctioning even with a slight error in the position of the attachment of the load sensor. The load sensor may be adapted that the projection is provided on both the front and reverse surfaces of the tip portion of the pressure-receiving portion, thereby allowing the load sensor to measure the load of a measurement object present on either the front or reverse side of the pressure-receiving portion.

The present invention also provides a load sensor comprising: a mount portion on one end of the load sensor, the mount portion being secured to an external device; an opening adjacent to the mount portion; strain-generating portions extending from the mount portion to the other end of the load sensor along the side rims of the opening, the strain-generating portions having at least one flat print surface; a pressure-receiving portion, linked to the strain-generating portions at the other end, projecting in the shape of the tongue into the opening; and strain-sensing elements, formed by printing on the print surface of the strain-generating portions, for sensing strain of the strain generating portions, the strain caused by a load applied to the pressure-receiving portion. The load sensor is adapted that under no load applied to the pressure-receiving portion, the tip portion of the pressure-receiving portion stays below a plane containing the print surface in the direction of thickness of the pressure-receiving portion.

As described above, the tip portion of the pressure-receiving portion may be adapted to stay in advance below a plane containing the print surface in the direction of thickness of the pressure-receiving portion. Accordingly, even when the pressure-receiving portion is deflected in the heating process during fabrication, there is no worry that the tip portion of the pressure-receiving portion stays above the print surface of the strain generating portions. It is thereby possible to avoid defective printing of the strain-sensing elements caused by the deflection of the pressure-receiving portion.

Incidentally, the tip portion of the pressure-receiving portion may be adapted to stay in advance below the plane containing the print surface of the strain-generating portions. In this case, for example, the tip portion of the pressure-receiving portion may be made thinner than the proximal end thereof in thickness. Alternatively, a pressure-receiving portion having a uniform thickness may be curved such that the tip portion thereof is gradually separated from the plane containing the print surface.

DETAILED DESCRIPTION OF THE PREFERRED EMBODIMENTS

Figure 1:
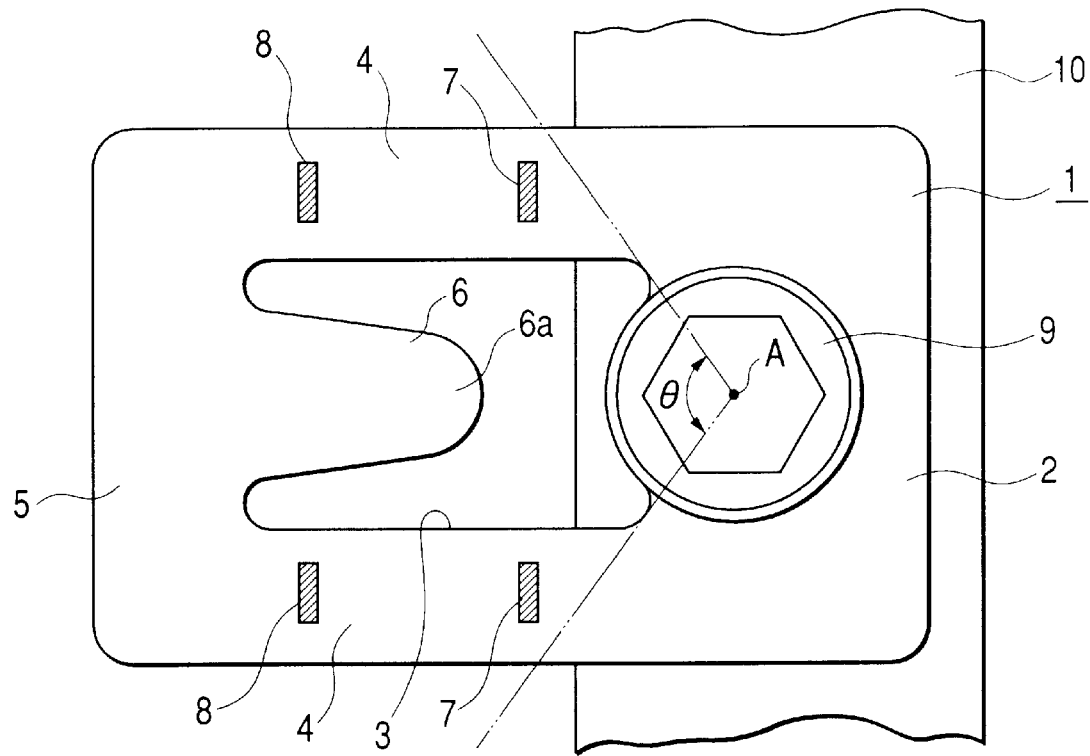
FIG. 1 is a plan view illustrating a load sensor according to a first embodiment of the present invention.
Figure 2:
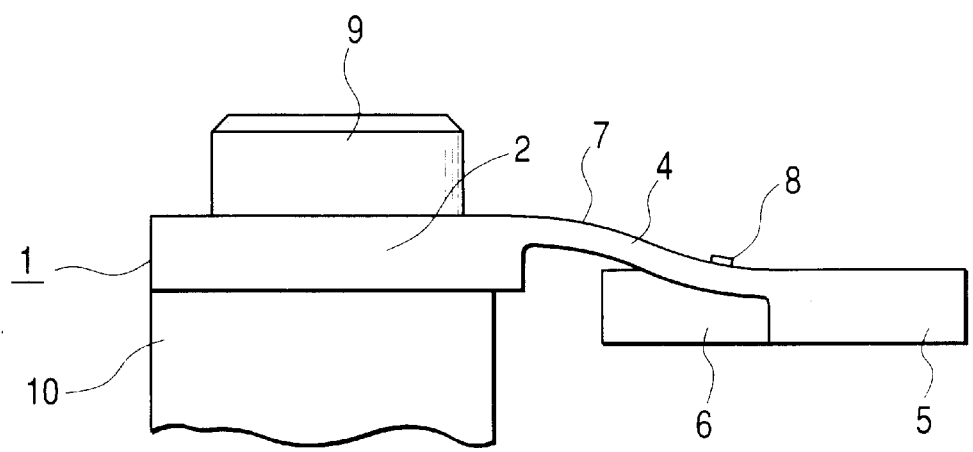
FIG. 2 is a side view illustrating the load sensor of FIG. 1 under a load.
Figure 3:
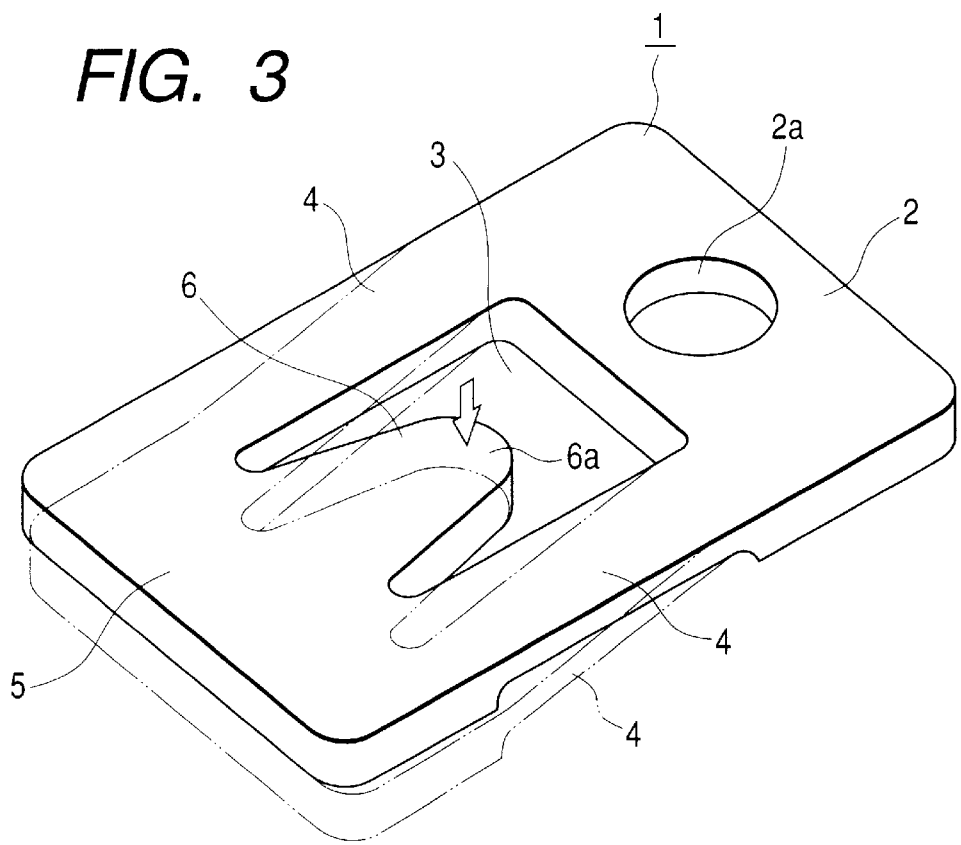
FIG. 3 is an explanatory view illustrating the operation of the load sensor shown in FIGS. 1 and 2.
Figure 4:
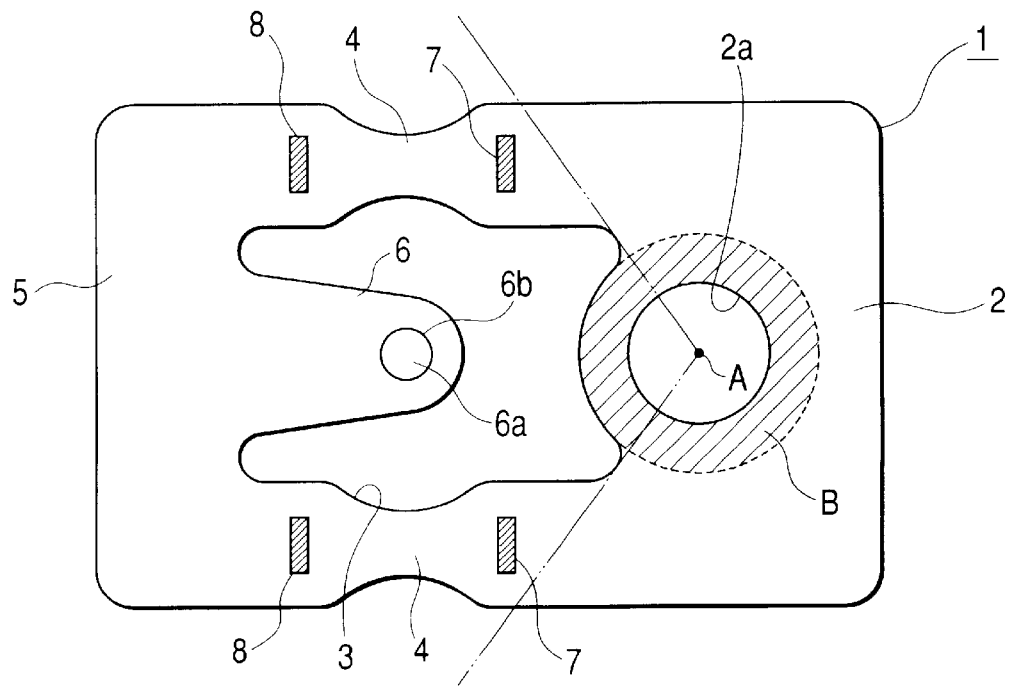
FIG. 4 is a plan view illustrating a load sensor according to a second embodiment of the present invention.
Figure 5:
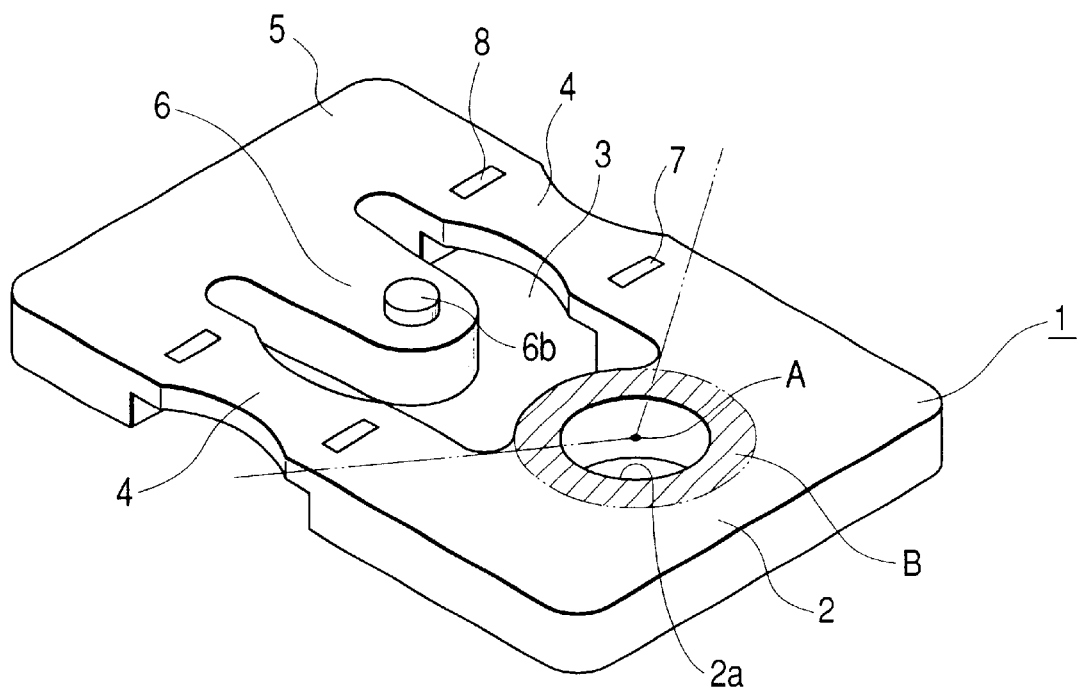
FIG. 5 is a perspective view illustrating the load sensor shown in FIG. 4.
Figure 6:
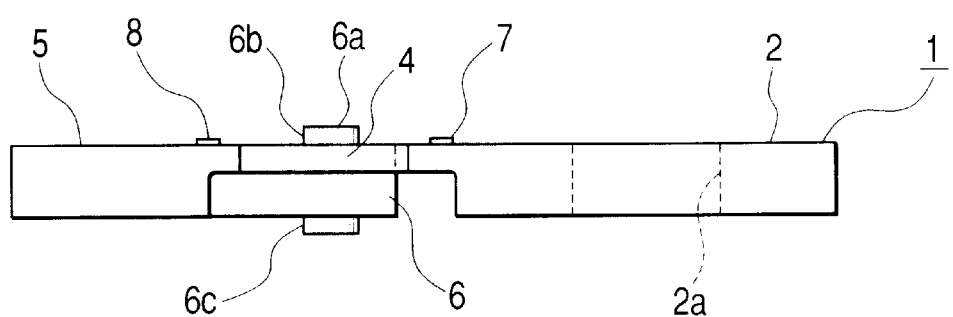
FIG. 6 is a side view illustrating the load sensor shown in FIGS. 4 and 5.
Figure 7:
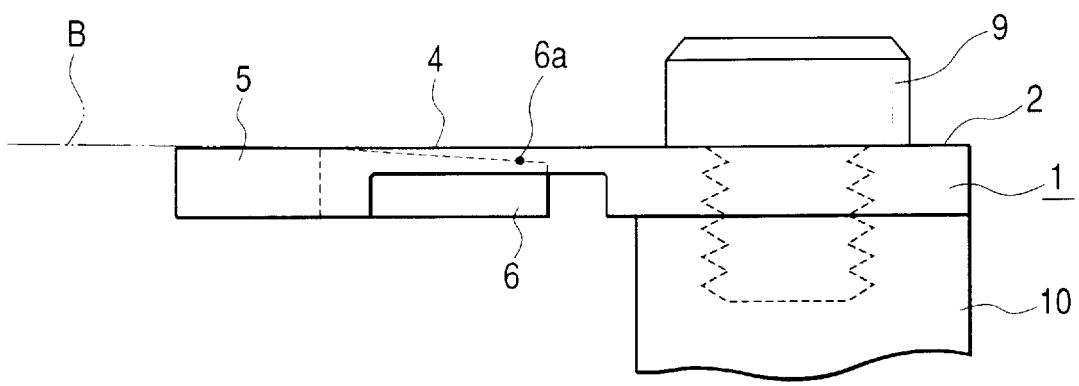
FIG. 7 is a side view illustrating a load sensor according to a third embodiment of the present invention.
Figure 8:
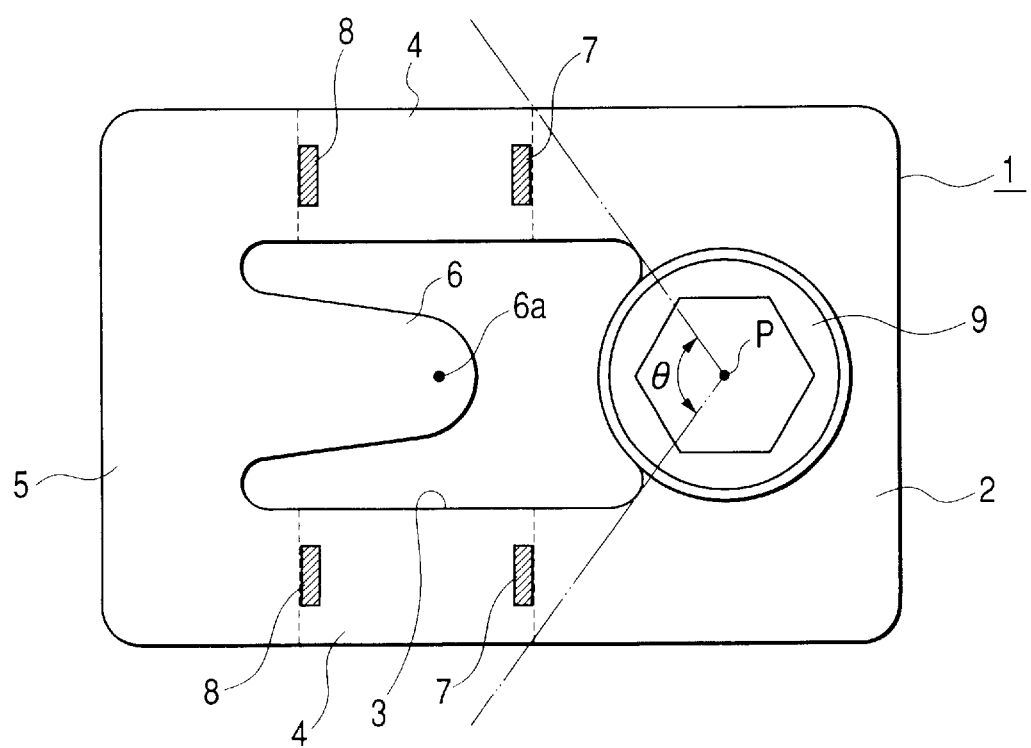
FIG. 8 is a plan view illustrating the load sensor shown in FIG. 7.
Figure 10:
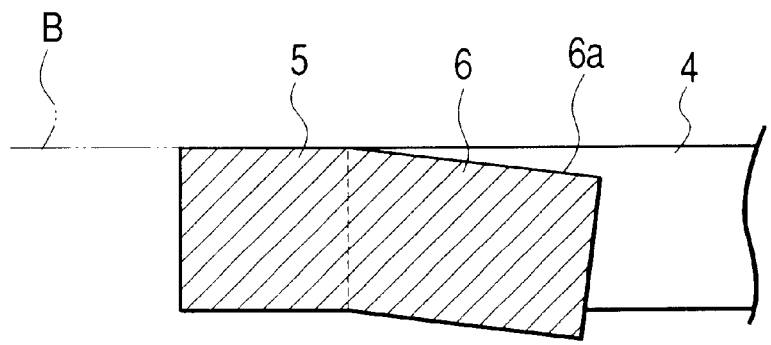
FIG. 10 is a cross-sectional view illustrating a modified example of the pressure-receiving portion shown in FIGS. 7 to 9.
Figure 11:
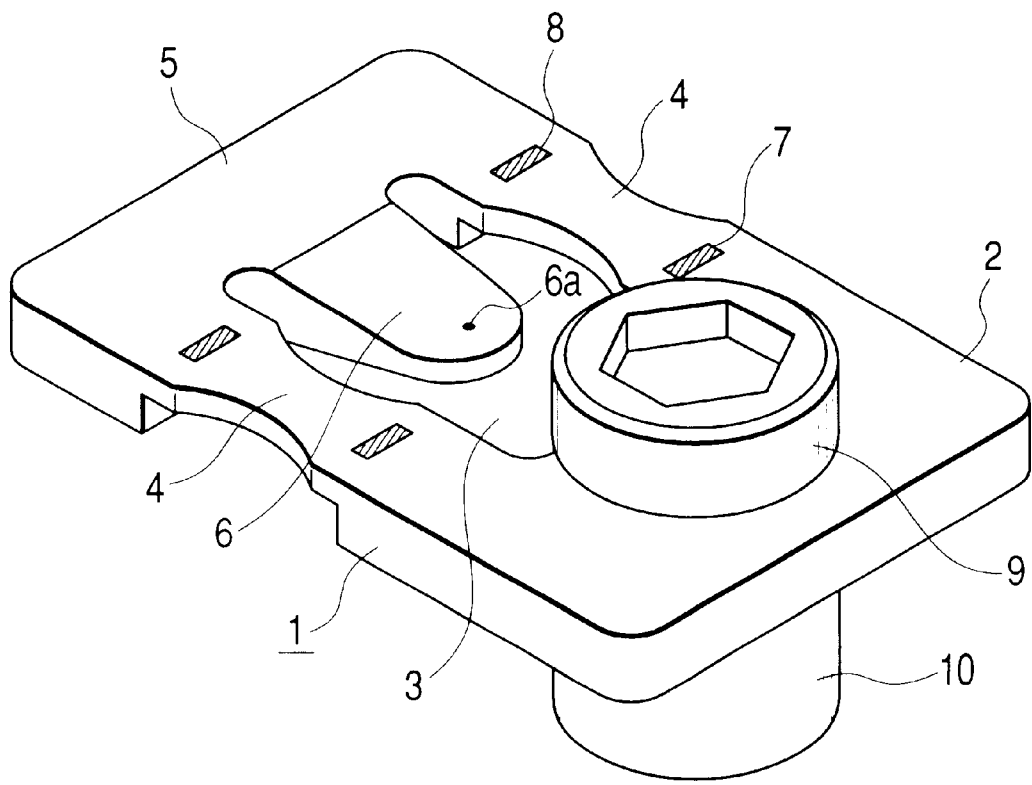
FIG. 11 is a perspective view illustrating a load sensor according to a fourth embodiment of the present invention.
Figure 12:
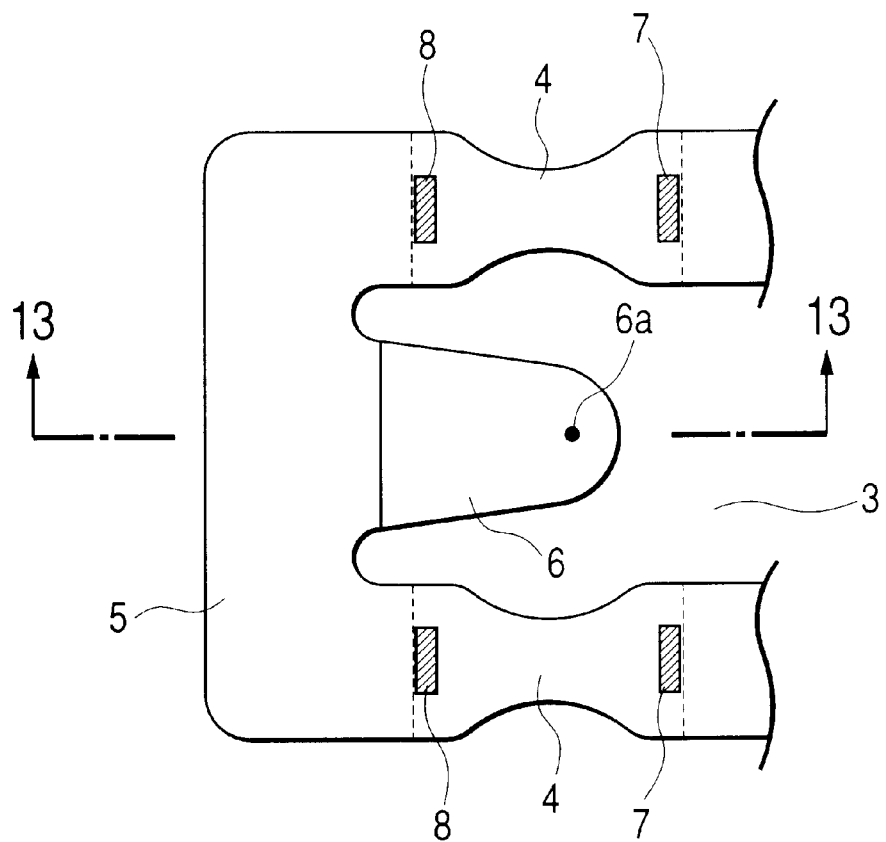
FIG. 12 is a plan view illustrating the main portion of the load sensor shown in FIG. 11.
Figure 13:
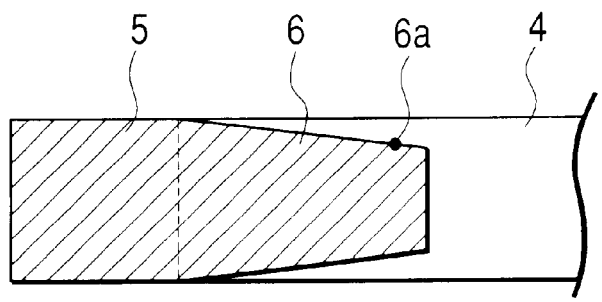
FIG. 13 is a cross-sectional view taken along line 13—13 of FIG. 12.
Figure 14:
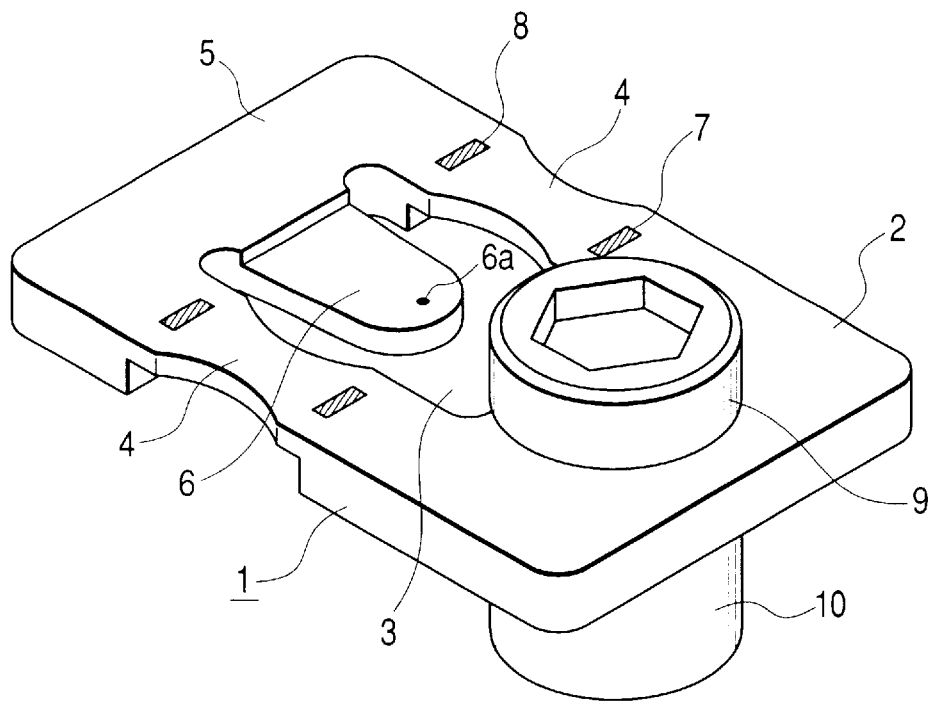
FIG. 14 is a perspective view illustrating the load sensor according to a fifth embodiment of the present invention.
Figure 15:
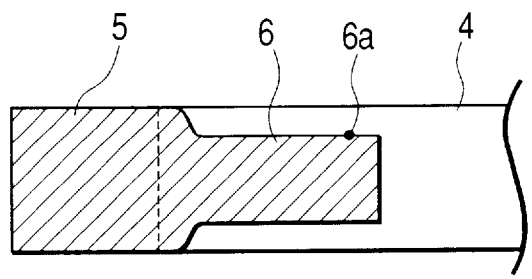
FIG. 15 is a cross-sectional view illustrating the pressure-receiving portion of the load sensor shown in FIG. 14.
Figure 16:
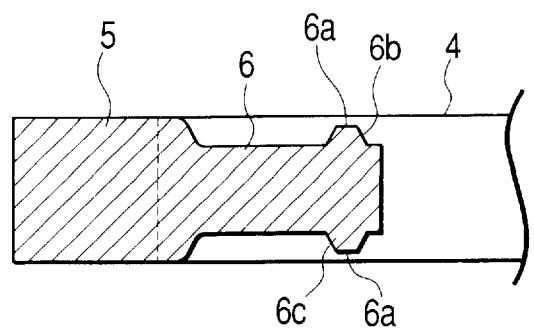
FIG. 16 is a cross-sectional view illustrating a modified example of the pressure-receiving portion shown in FIGS. 14 to 15.
Figure 17:
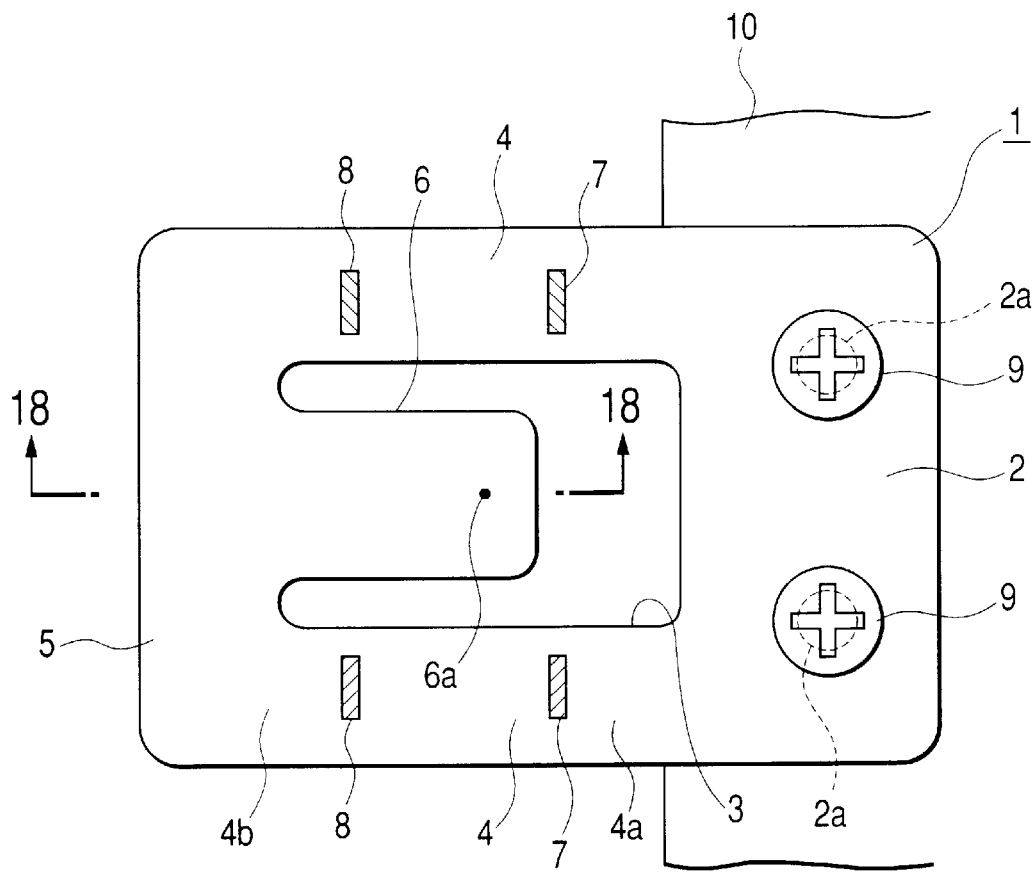
FIG. 17 is a plan view illustrating a prior-art load sensor.
Figure 18:
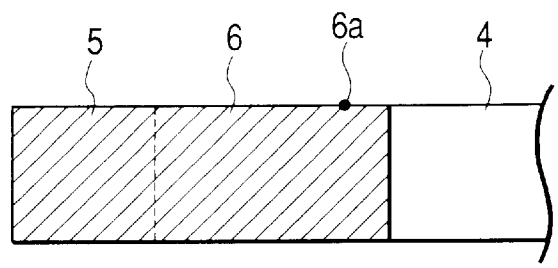
FIG. 18 is a cross-sectional view taken along line 18—18 of FIG. 17.

Now, the present invention will be explained below in more detail with reference to the accompanying drawings in accordance with the embodiments. FIG. 1 is a plan view illustrating a load sensor according to a first embodiment. FIG. 2 is a side view illustrating the load sensor of FIG. 1 under a load. FIG. 3 is an explanatory view illustrating the operation of the load sensor shown in FIGS. 1 and 2. FIG. 4 is a plan view illustrating a load sensor according to a second embodiment. FIG. 5 is a perspective view illustrating the load sensor shown in FIG. 4. FIG. 6 is a side view illustrating the load sensor shown in FIGS. 4 and 5. FIG. 7 is a side view illustrating a load sensor according to a third embodiment. FIG. 8 is a plan view illustrating the load sensor shown in FIG. 7. FIG. 9 is a view illustrating the printing process for fabricating the load sensor shown in FIGS. 7 and 8. FIG. 10 is a cross-sectional view illustrating a modified example of the pressure-receiving portion shown in FIGS. 7 to 9. FIG. 11 is a perspective view illustrating a load sensor according to a fourth embodiment. FIG. 12 is a plan view illustrating the main portion of the load sensor shown in FIG. 11. FIG. 13 is a cross-sectional view taken along line 13—13 of FIG. 12. FIG. 14 is a perspective view illustrating the load sensor according to a fifth embodiment. FIG. 15 is a cross-sectional view illustrating the pressure-receiving portion of the load sensor shown in FIG. 14. Finally, FIG. 16 is a cross-sectional view illustrating a modified example of the pressure-receiving portion shown in FIGS. 14 to 15. In these figures, like reference numerals designate like or similar parts of FIGS. 17 and 18, which have been used for describing the prior art.

Now, the first embodiment is described with reference to FIGS. 1 to 3, in which reference numeral 1 indicates the base body of the load sensor and reference numerals 7, 8 indicate strain-sensing elements, each disposed on the base body 1 and formed of a thick-film resistive material. The load sensor is provided with the base body 1 that is fixed by pressure at one end portion to an external support member 10 using a bolt 9 or securing screw means. The base body 1 is formed of a sheet of metal such as SUS. The base body 1 comprises a mount portion 2 on the side of a securing end and a pair of strain generating portions 4 that extend from the mount portion 2 along the rims on both sides of an opening 3. The base body 1 further comprises a link portion 5 for linking the free ends of the strain generating portions 4 together and a pressure-receiving portion 6 that projects in the shape of the tongue from the link portion 5 into the opening 3.

Among the components of the base body 1, each of the strain generating portions 4 is thinner than other portions and therefore subject to deflections. On each of the strain generating portions 4, the strain-sensing elements 7, 8 are formed at a portion near the mount portion 2 and at a portion near the link portion 5, respectively. Although not illustrated, the strain-sensing elements 7, 8, arranged at four points in total, are interconnected to constitute a Wheatstone bridge circuit. There is provided a screw hole 2a (see FIG. 3) bored generally at the center of the mount portion 2. The bolt 9 that is inserted in the screw hole 2a is screwed with a strong fastening force into a screw hole (not shown in any figures) of the support member 10. In other words, the head of the bolt 9 exerts a pressure on the circumferential portion of the screw hole 2a, thereby securing the mount portion 2 to the external support member 10. Incidentally, it is considered that a group of straight lines that pass through center A of the screw hole 2a and within the opening 3 is restricted within the range of angle θ shown in FIG. 1. The strain-sensing elements 7, 8 are thus arranged within this range, thereby allowing the bolt 9 to be fastened strongly without having an adverse effect on the characteristic of the strain-sensing elements 7, 8.

The tongue-shaped pressure-receiving portion 6 is provided at the tip portion thereof with a loading point 6a, on which an object of measurement exerts a load. Application of the load to the loading point 6a would cause each of the thin strain generating portions 4 to be deformed as shown in FIGS. 2 and 3. At this time, each of the strain generating portions 4 is deformed slightly in the shape of a letter "S", thereby causing bending moments, opposite in direction to each other, to be produced near the mount portion 2 and near the link portion 5, respectively. Therefore, the strain-sensing element 7 near the mount portion 2 senses a tensile force, whereas the strain-sensing element 8 near the link portion 5 senses a compressive force. Accordingly, the level of the strain sensed by the strain-sensing elements 7, 8 makes it possible to determine the load acted upon the loading point 6a with high accuracy. Furthermore, in the case of this load sensor, the distance between the loading point 6a and the strain-sensing element 7 is made generally equal to the distance between the loading point 6a and the strain-sensing element 8. The tensile stress sensed by the strain-sensing element 7 is thus made generally equal in magnitude to the compressive stress sensed by the strain-sensing element 8. This therefore allows the Wheatstone bridge circuit including the strain-sensing elements 7, 8 to be made simple in structure.

As described above, this embodiment is designed to have part of the opening 3 interposed between the strain-sensing elements 7, 8 formed on each of the strain generating portions 4 and the center A of the screw hole 2a of the mount portion 2. That is, it is taken into account that the opening 3 blocks a deformation caused by a strong fastening force of the bolt 9 that exerts a pressure on the circumferential portion of the screw hole 2a so that the deformation will not directly have an effect on the strain-sensing elements 7, 8. This prevents the strain-sensing elements 7, 8 from varying in characteristic from product to product and provides a good sensing accuracy, thereby making the load sensor highly reliable. Incidentally, the load sensor may also be designed such that part of the opening 3 is always interposed between the circumferential portion of the screw hole 2a and the strain-sensing elements 7, 8. This would extremely reduce the possibility that the deformation caused by the fastening force of the bolt 9 has an effect on the strain-sensing elements 7, 8. Furthermore, for this sensor, a sheet of metal can be easily machined to form the base body 1 as well as a bridge circuit incorporating the strain-sensing elements 7, 8 can be easily formed on the base body 1 by a method such as printing. This provides an advantage of reducing fabrication costs.

Now, a second embodiment is described below. Referring to FIGS. 4 to 6, the load sensor shown in these figures is also designed such that part of the opening 3 is interposed between the strain-sensing elements 7, 8 formed on each of the strain generating portions 4 and the center A of the screw hole 2a of the mount portion 2. This design reduces the possibility that the deformation caused by the strong fastening force of the securing screw means that exerts a pressure on the circumferential portion (shown by shaded area B in FIGS. 4 and 6) has an adverse effect on the strain-sensing elements 7, 8.

Incidentally, the base body 1 of this second embodiment is different in shape from that of the first embodiment. That is, the base body 1 shown in FIGS. 4 to 6 is constricted in the middle of the longitudinal direction of each of the strain generating portions 4. On both the front and reverse surfaces of the tip portion of the pressure-receiving portion 6, the base body 1 is also provided with projections 6b, 6c, which project in the direction of the thickness of the base body 1, allowing the top portions of the projections 6b, 6c to serve as the loading point 6a. The constricted shape of each of the strain generating portions 4 causes each of the strain generating portions 4 to deflect considerably when acted upon by a load, thereby allowing the strain-sensing elements 7, 8 to sense a significant strain. This makes it possible to provide a further improved sensing accuracy. In addition, in case that the top of the projection 6b provided on the surface of the tip portion of the pressure-receiving portion 6 acts as the loading point 6a, a load of a measurement object can be positively applied to the loading point 6a even when the measurement object is more or less misaligned with the load sensor in the direction of the base surface of the base body 1. This makes it possible for the load sensor to avoid malfunctioning even with a slight error in the position of the attachment of the load sensor. This therefore allows the load sensor to be easily attached and provide an improved reliability. In addition to the projection 6b, the projection 6c is also provided on the reverse side of the tip portion of the pressure-receiving portion 6. This makes it possible for the load sensor to measure the load of a measurement object present on either the front or reverse side thereof, thereby improving the ease-of-use of the load sensor.

Now, the third embodiment is described with reference to FIGS. 7, 8, and 9A to 9C, in which the base body of the load sensor is designated by reference numeral 1, an insulative-coated layer formed by printing on the base body 1 is designated by reference numeral 11, and a trace pattern formed by printing on the insulative-coated layer 11 is designated by reference numeral 12. The base body 1 is formed of a sheet of metal such as SUS. The base body 1 comprises a mount portion 2 on the side of a securing end and a pair of strain generating portions 4 that extend from the mount portion 2 along the rims on both sides of an opening 3 adjacent thereto. The base body 1 further comprises a link portion 5 for linking the free ends of the strain generating portions 4 together and a pressure-receiving portion 6 that projects in the shape of the tongue from the link portion 5 into the opening 3. The tip portion of the pressure-receiving portion 6 serves as a loading point 6a to which the load of a measurement object is applied. As shown in FIG. 7, the pressure-receiving portion 6 has an inclined surface on which the loading point 6a is provided, so that the pressure-receiving portion 6 is more reduced in thickness towards the tip portion thereof. Therefore, the tip portion of the pressure-receiving portion 6 is submerged in the opening 3 under no load. Furthermore, among the components of the base body 1, each of the strain generating portions 4 is more reduced in thickness than any other portions and therefore subject to deflection.

Figure 9A:
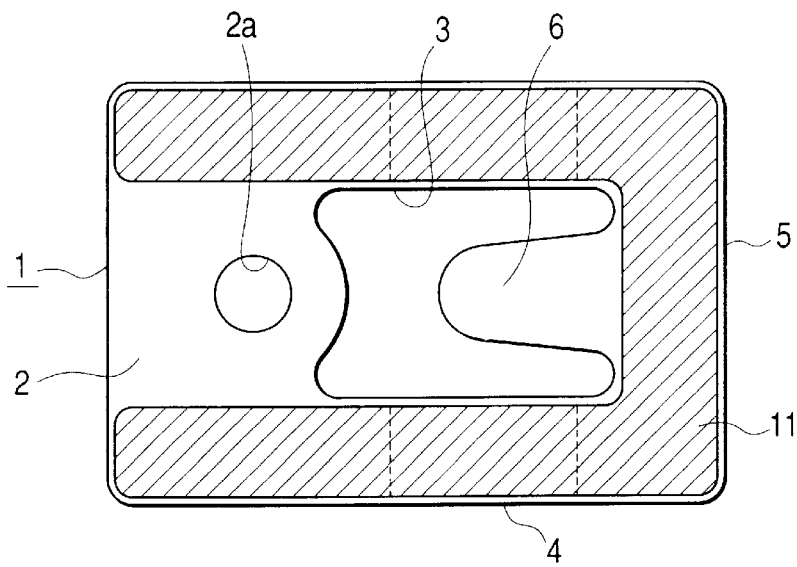
FIG. 9 is a view illustrating the printing process for fabricating the load sensor shown in FIGS. 7 and 8.
Figure 9B:
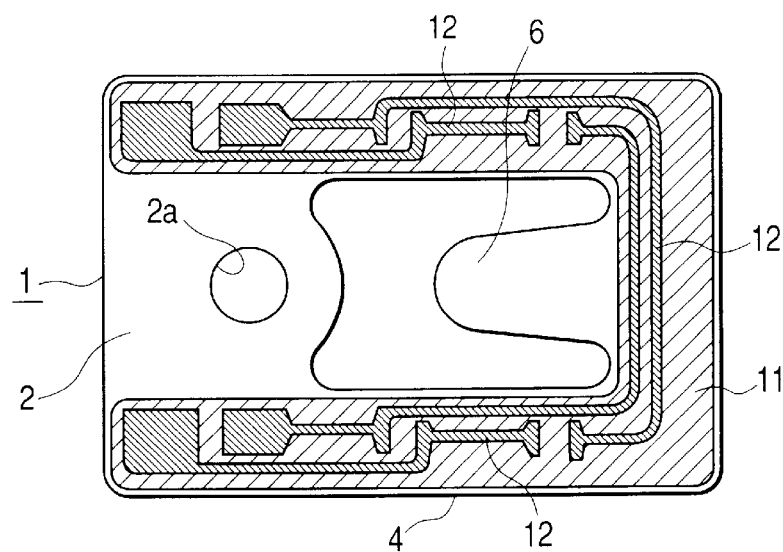
Figure 9C:
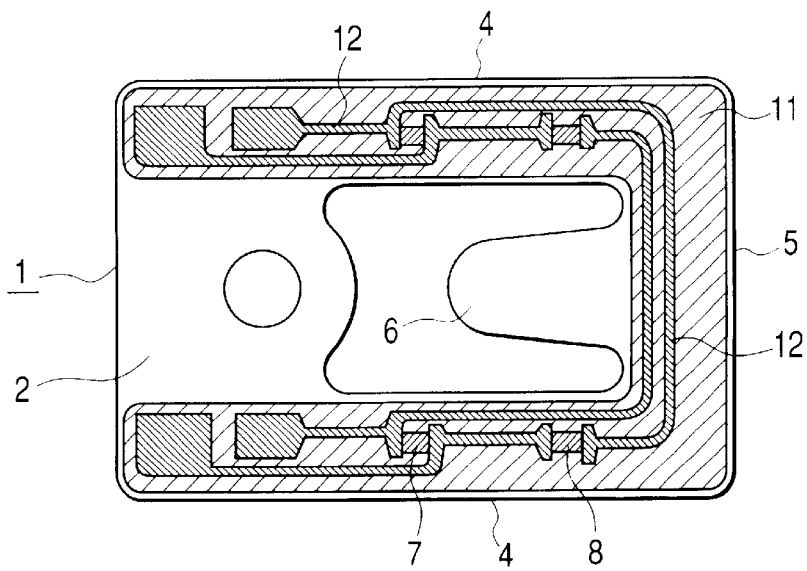

As shown in FIG. 9A, the insulative-coated layer 11 is printed on a surface (the upper surface in FIG. 7) of the base body 1, while the trace pattern 12 is printed on this insulative-coated layer 11 as shown in FIG. 9B. In addition to this, as shown in FIG. 9C, the strain-sensing elements 7, 8, formed of a thick-film resistive material, are each printed at the predetermined position on each of the strain generating portions 4. The strain-sensing elements 7, 8, arranged at four points in total, are interconnected with the trace pattern 12 to constitute a Wheatstone bridge circuit. There is provided a screw hole 2a (see FIG. 9) bored in the mount portion 2. The bolt 9 that is inserted in the screw hole 2a is screwed with a strong fastening force in a screw hole of the support member 10. In other words, the head of the bolt 9 exerts a pressure on the circumferential portion of the screw hole 2a, thereby securing the mount portion 2 to the external support member 10. Incidentally, it is considered that a group of straight lines that pass through center P of the screw hole 2a and within the opening 3 is restricted within the range of angle θ shown in FIG. 8. The strain-sensing elements 7, 8 are printed within this range, thereby allowing the bolt 9 to be fastened strongly without having an adverse effect on the characteristic of the strain-sensing elements 7, 8.

In this load sensor, application of a load to the loading point 6a on the tip portion of the pressure-receiving portion 6 would cause each of the thin strain generating portions 4 to be deformed. At this time, each of the strain generating portions 4 is deformed slightly in the shape of a letter "S", thereby causing bending moments, opposite in direction to each other, to be produced near the mount portion 2 and near the link portion 5, respectively. Therefore, the strain-sensing element 7 near the mount portion 2 senses a tensile force, whereas the strain-sensing element 8 near the link portion 5 senses a compressive force. Accordingly, the level of the strain sensed by the strain-sensing elements 7, 8 makes it possible to determine the load acted upon the loading point 6a with high accuracy. Furthermore, in the case of this load sensor, the distance between the loading point 6a and the strain-sensing element 7 is made generally equal to the distance between the loading point 6a and the strain-sensing element 8. The tensile stress sensed by the strain-sensing element 7 is thus made generally equal in magnitude to the compressive stress sensed by the strain-sensing element 8. This therefore allows the Wheatstone bridge circuit including the strain-sensing elements 7, 8 to be made simple in structure.

Suppose that the tongue-shaped pressure-receiving portion 6 is deflected through the heating process for forming the insulative-coated layer 11 and the trace pattern 12 by printing. As described above, this embodiment is provided with a tip portion of the pressure-receiving portion 6 having the loading point 6a, the tip portion being submerged in the opening 3 in advance. Thus, it will never happen that the tip portion of the pressure-receiving portion 6 stays above the plane B (see FIG. 7) containing the print surface of the strain generating portions 4. There is therefore no worry that deflections of the pressure-receiving portion 6 will cause defective printing of the strain-sensing elements 7, 8. In other words, the strain-sensing elements 7, 8 can be always printed smoothly without being interfered by the pressure-receiving portion 6, thereby providing improved fabrication yields. There is thus no worry that the sensing accuracy of the strain-sensing elements 7, 8 will be impaired. Furthermore, in this embodiment, the load sensor is designed such that part of the opening 3 is interposed between the strain-sensing elements 7, 8 formed by printing on each of the strain generating portions 4 and the center P of the screw hole 2a of the mount portion 2. It is thus considered in this design that the deformation caused by the strong fastening force of the bolt 9 that exerts a pressure on the circumferential portion of the screw hole 2a is blocked by the opening 3 to exert no direct effect on the strain-sensing elements 7, 8. Consequently, this prevents the strain-sensing elements 7, 8 from varying in characteristic from product to product, thereby providing a highly reliable load sensor.

Incidentally, in this embodiment, the pressure-receiving portion 6 is more reduced in thickness gradually towards the tip portion. However, as shown in FIG. 10, the pressure-receiving portion 6 having a uniform thickness may be curved and thereby gradually separated from the plane B containing the print surface of the strain generating portions 4, whereby the tip portion of the pressure-receiving portion 6 stays below the plane B in advance.

Furthermore, in this embodiment, such a case has been described in which the base body 1 is formed of a sheet of metal. However, the base body 1 may be formed of an insulating substrate, in the case of which it is not necessary to form the insulative-coated layer 11 on the base body 1.

Now, the fourth embodiment is described below with reference to FIGS. 11 to 13, in which the load sensor is provided with an inclined surface on both the front and reverse surfaces of the tongue-shaped pressure-receiving portion 6, and projected into the opening 3 is the pressure-receiving portion 6 that is reduced in thickness in the shape of a wedge. Like in the first embodiment, the tip portion of the pressure-receiving portion 6 is submerged in the opening 3 under no load. Accordingly, even when the pressure-receiving portion 6 is deflected in the heating process during fabrication, there is no possibility that the tip portion of the pressure-receiving portion 6 stays above the print surface of the strain generating portions 4 to impair the printing of the strain-sensing elements 7, 8.

Incidentally, in the fourth embodiment, the base body 1 is slightly different in shape from that of the first embodiment. That is, the base body 1 shown in FIGS. 11 and 12 is constricted in the middle of the longitudinal direction of each of the strain generating portions 4. This shape causes each of the strain generating portions 4 to deflect considerably when acted upon by a load, thereby allowing the strain-sensing elements 7, 8 to sense a significant strain. This makes it possible to provide a further improved sensing accuracy.

Now, the fifth embodiment is described below with reference to FIGS. 14 and 15, in which the load sensor allows the tongue-shaped pressure-receiving portion 6 to be thicker only on the side of the proximal end (on the side of the link portion 5) and all other portions to be thinner. Accordingly, like in the third and fourth embodiments, the tip portion of the pressure-receiving portion 6 is also submerged in the opening 3 under no load. It is thereby possible to avoid defective printing of the strain-sensing elements 7, 8 caused by the deflection of the pressure-receiving portion 6.

Suppose that projections 6b, 6c which project in the direction of thickness and the top portions of which serve as the loading point 6a are provided on both the front and reverse surfaces of the tip portion of the pressure-receiving portion 6, as shown in the modified example of FIG. 16. In this case, it is made possible for the load sensor to measure the load of a measurement object present on either the front or reverse side thereof, thereby improving the ease-of-use of the load sensor. In addition to this, the load of the measurement object can be positively applied to the loading point 6a even when the measurement object is more or less misaligned with the load sensor in the direction of the base surface of the base body 1. This makes it easier for the load sensor to avoid malfunctioning even with a slight error in the position of the attachment of the load sensor.

The present invention is implemented in the embodiments described above and provides the following effects.

The load sensor of the present invention is designed such that part of the opening is interposed between the strain-sensing elements formed by printing on each of the strain generating portions and the center of the screw hole of the mount portion, so that a deformation caused by a strong fastening force that exerts a pressure on the circumferential portion of the screw hole exerts no direct effect on the strain-sensing elements. Consequently, this prevents the strain-sensing elements from varying in characteristic from product to product, thereby providing a highly reliable load sensor.

Furthermore, projections which project in the direction of thickness and the top portions of which serve as a loading point are provided on the tip portion of the pressure-receiving portion. This ensures that the load of a measurement object can be applied to the loading point even when the measurement object is more or less misaligned with the load sensor. Therefore, this makes it possible for the load sensor to avoid malfunctioning even with a slight error in the position of the attachment of the load sensor, thereby providing improved efficiency of attachment and reliability. In addition to this, the aforementioned projections may be provided on both the front and reverse surfaces of the tip portion of the pressure-receiving portion to thereby allow the load sensor to measure the load of a measurement object present on either the front or reverse side of the pressure-receiving portion. This improves the ease-of-use of the load sensor.

Furthermore, according to the load sensor of the present invention, the tip portion of the pressure-receiving portion having a loading point is allowed to stay in advance below the plane containing the print surface of the strain generating portions in the direction of thickness. Accordingly, even when the pressure-receiving portion is deflected in the heating process during fabrication, the tip portion of the pressure-receiving portion will never stay above the print surface of the strain generating portions. Therefore, it is possible to avoid defective printing of the strain-sensing elements caused by the deflection of the pressure-receiving portion, providing a load sensor stabilized in quality and improved in fabrication yield.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A load sensor comprising:
   a mount portion on one end of said load sensor, said mount portion being secured to an external device;
   an opening adjacent to the mount portion;
   strain-generating portions extending from said mount portion to the other end of said load sensor along side rims of said opening, said strain-generating portions having at least one flat print surface;
   a pressure-receiving portion, linked to said strain-generating portions at the other end, projecting in a shape of a tongue into said opening; and strain-sensing elements, formed by printing on said print surface of said strain-generating portions, for sensing strain of said strain generating portions, said strain caused by a load applied to said pressure-receiving portion, wherein the tip portion of said pressure-receiving portion is thinner than a proximal end of said pressure-receiving portion in thickness so that under no load applied to said pressure-receiving portion, said tip portion of said pressure-receiving portion stays below a plane containing said print surface in the direction of thickness of said pressure-receiving portion.

\* \* \* \* \*